Patented Sept. 29, 1942

2,296,911

UNITED STATES PATENT OFFICE 2,296,911

NITROGLYCERIN RESISTANT PLASTIC CONTAINER

John M. De Bell, Longmeadow, Mass., assignor to Monsanto Chemical Company, St. Louis, Mo., a corporation of Delaware No Drawing. Application November 24, 1939, Serial No. 305,891

11 Claims. (Cl. 102—1)

The present invention relates to the use of nitroglycerin resistant plastic compositions.

In the manufacture of nitroglycerin compositions, as for example dynamite and certain smokeless powder compositions containing nitroglycerin, it has been found desirable to employ a container, either for the nitroglycerin composition itself or for ingredients coming in intimate contact therewith, made of plastic material. Due to the solvent action of the nitroglycerin, most plastics are not adapted for such proposed uses, and in consequence up to the present time, little progress has been made in this direction.

It has now been found according to the present invention that the co-polymers of vinyl halides and vinyl esters of fatty acids, and more particularly vinyl esters of lower aliphatic acids, are markedly resistant to the solvent action of nitroglycerin. In its more preferred form the plastic comprises a co-polymer of a vinyl halide and a vinyl ester of a fatty acid wherein the vinyl halide comprises at least 50% by weight of the polymerizable substances. Such co-polymers are disclosed in Reid U. S. Patent 1,935,577 and in Reppe U. S. Patent 2,118,864, and the products themselves form no part of this invention. In consequence of said solvent resistance, containers or closures made of the said co-polymers have been found especially useful where they come in contact with nitroglycerin or nitroglycerin-containing compositions. As specific examples of co-polymers of vinyl halides and vinyl esters of fatty acids, I may employ a co-polymer or vinyl chloride and vinyl acetate, a co-polymer of vinyl chloride and vinyl butyrate, and a co-polymer of vinyl chloride and vinyl formate, and molding powders made therefrom. In their preferred form the vinyl halide-vinyl ester co-polymers, when employed in molding compositions, have a small proportion of a stabilizer, for example, lead oleate incorporated therein.

Of especial value is the use of molding compositions comprising a co-polymer of a vinyl halide and a vinyl ester of a fatty acid in detonator moldings.

It is well known that high explosives are generally fired by means of a very sudden and intense blow and which blow is effected only by means of an explosive which itself detonates with a velocity of several thousand meters per second. Detonators are generally composed, in part at least, of substances such as fulminate of mercury or lead azide and are generally fired by means of an electric current. Such substances do not produce their full effect when unconfined, but a thin copper capsule provides sufficient confinement. However, the use of copper has left much to be desired, and moreover, is relatively expensive. In order to eliminate the use of the copper or similar capsule, numerous attempts have been made to employ a container for the detonating substance made of molded plastic. Such attempts have met with little success due, to a marked degree, to their inherent property of absorption of, or dissolving in, nitroglycerin. Since the detonator is placed within the explosive mass, or adjacent to it, before detonation, and may, under certain conditions, be allowed to remain in contact therewith for extended periods of time, it is readily apparent that the detonator plastic molding cannot absorb or be dissolved by nitroglycerin.

Molding powders comprising co-polymers of a vinyl halide and a vinyl ester of a fatty acid and in particular a vinyl ester of a lower aliphatic acid have been found to meet these exacting requirements, whereas molding powders comprising many of the well known plastics, for example, cellulose esters, and polyvinyl acetals are ineffective for this purpose. Detonator containers or closures molded from a molding powder comprising a co-polymer of substantially 80 parts by weight of vinyl chloride and substantially 20 parts by weight of vinyl acetate and containing a small proportion of lead oleate as a stabilizer showed no absorption of liquid nitroglycerin in two weeks. The marked efficiency and desirability of detonator moldings made from co-polymers of vinyl halides and vinyl esters of fatty acids is then readily apparent. Other members of this same class of compounds and other ratios of the polymerizable components may be similarly employed. As stated above, however, it will generally be found desirable to employ a co-polymer obtained by the conjoint polymerization of a vinyl halide and a vinyl ester of a fatty acid wherein the vinyl halide comprises at least 50% by weight of the total polymerizable substances.

Other and similar uses of the resins obtained by the conjoint polymerization of vinyl halides and vinyl esters of fatty acids may be made. Thus, they may be employed as containers or closures for dynamite or nitroglycerin-containing smokeless powders.

The invention is limited solely by the claims appended hereto as a part of this application.

What is claimed is:

1. In an explosive charge including a nitroglycerin-containing component, a container for containing said component, at least the inner surface of said container consisting principally of a co-polymer of a vinyl halide and a vinyl ester of a fatty acid.

2. In combination, a nitroglycerin-resistant container, a nitroglycerin-containing composition therein, said container having a surface thereof in intimate contact with said nitroglycerin-containing composition, said surface consisting principally of a co-polymer of a vinyl halide and a vinyl ester of a fatty acid.

3. In combination, a nitroglycerin-resistant container, a nitroglycerin-containing composition therein, said container having a surface thereof in intimate contact with said nitroglycerin-containing composition, said surface consisting principally of a co-polymer of a vinyl halide and a vinyl ester of a lower aliphatic acid.

4. In combination, a nitroglycerin-resistant container, a nitroglycerin-containing composition therein, said container having a surface thereof in intimate contact with said nitroglycerin-containing composition, said surface consisting principally of a co-polymer of a vinyl halide and a vinyl ester of a lower aliphatic acid, and wherein the vinyl halide comprised at least 50% by weight of the total polymerizable substances.

5. In combination, a nitroglycerin container, a nitroglycerin-containing composition therein and in intimate contact therewith, said container consisting principally of a co-polymer of vinyl chloride and vinyl acetate, and wherein the vinyl chloride comprised at least 50% by weight of the total polymerizable substances.

6. In combination, a nitroglycerin-resistant detonator container, a nitroglycerin-containing composition in intimate contact with a surface thereof, said surface consisting principally of a co-polymer of a vinyl halide and a vinyl ester of a fatty acid.

7. In combination, a nitroglycerin-resistant detonator container, a nitroglycerine-containing composition in intimate contact with a surface thereof, said surface consisting principally of a co-polymer of a vinyl halide and a vinyl ester of a lower aliphatic acid, and wherein the vinyl halide comprised at least 50% by weight of the total polymerizable substances.

8. In combination, a nitroglycerin-resistant detonator container, a nitroglycerin-containing composition in intimate contact therewith, said container consisting principally of a co-polymer of vinyl chloride and a vinyl ester of a lower aliphatic acid, and wherein the vinyl chloride comprised at least 50% by weight of the total polymerizable substances.

9. In combination, a nitroglycerin-resistant detonator container, a nitroglycerin-containing composition in intimate contact therewith, said container consisting principally of a co-polymer of vinyl chloride and vinyl acetate.

10. In combination, a nitroglycerin-resistant detonator container, a nitroglycerin-containing composition in intimate contact therewith, said container consisting principally of a co-polymer formed by the conjoint polymerization of substantially 80 parts by weight of vinyl chloride and substantially 20 parts by weight of vinyl acetate.

11. In an explosive charge including a nitroglycerin-containing component and a detonating charge; a container for containing said detonating charge, at least one surface of said container consisting principally of a co-polymer of a vinyl halide and a vinyl ester of a fatty acid.

JOHN M. DE BELL.